United States Patent Office 3,576,840
Patented Apr. 27, 1971

3,576,840
CERTAIN 2,2-DINITRO-2-FLUOROETHYL CARBAMATES
Milton B. Frankel, Tarzana, Calif., assignor to North American Rockwell Corporation, El Segundo, Calif.
No Drawing. Continuation-in-part of application Ser. No. 616,428, Feb. 10, 1967. This application Sept. 23, 1968, Ser. No. 761,881
Int. Cl. C07c 79/46, 125/04, 125/06
U.S. Cl. 260—471
6 Claims

ABSTRACT OF THE DISCLOSURE

Compounds of the formula

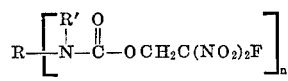

are provided wherein R is alkyl, alkylene, dinitrofluoroalkyl, phenyl, nitrophenyl, phenylene or nitrophenylene, R' is hydrogen or nitro and $n$ is 1 or 2. Compounds of the formula $M[OCH_2C(NO_2)_2F]_x$ are also provided wherein M is S, B, P, Si, S→O or P→O and X is the free valence of M. These compounds are useful as explosives.

CROSS-REFERENCE TO RELATED APPLICATION

This application is a continuation-in-part to applicant's copending application, Ser. No. 616,428, filed Feb. 10, 1967, now abandoned.

BACKGROUND OF THE INVENTION

In searching for explosives, two main properties are of prime importance. Explosives should have obviously high energy. Yet, the high energy often cannot be sacrificed for stability. Thus, the second important criteria for many explosives is stability. This includes both thermal and impact sensitivity. It is desirable for many applications that the material not be overly sensitive to temperatures above 150° C. and not be sensitive to impacts encountered in handling, high G loads and the like. To date one has not been able to obtain explosives having high energy and good stability. The nitro aromatic explosives, for example, TNT, have the highest thermal stability, yet have relatively low energy levels. Alternatively, at the other end of the scale, $NF_2$ compounds have the highest known energy levels yet possess unsuitable thermal and impact stability. Thus, it can readily be seen that to date one has not been able to have explosives that combine both the properties of high energy and stability. The art has thus searched for new materials which will fall in between the extreme ranges of the nitro aromatic and $NF_2$ compounds and possess thermal stabilities and energies at levels intermediate of the two extremes. The compounds of this invention lie within the intermediate area between the two extremes and possess good impact sensitivity as well as thermal sensitivity while having good energy levels.

Thus, it is an object of this invention to provide a new class of chemical compounds.

It is a further object of this invention to provide a novel class of dinitrofluoroethyl esters and carbamates useful as explosives.

These and other objects of the invention will be readily apparent to those skilled in the art from the following specification and appended claims.

SUMMARY OF THE INVENTION

The compounds of this invention have the following general formula:

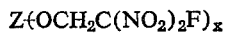

where Z is:

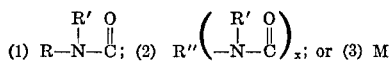

R is selected from the class consisting of alkyl, dinitrofluoroalkyl, phenyl, and nitrophenyl of 1 to 10 C atoms where $x=1$, and wherein R' is H or $NO_2$, and wherein R' is H or $NO_2$, and wherein
R" is selected from the class consisting of alkylene, phenylene and nitrophenylene radical of 1 to 12 C atoms wherein $x=2$, and where Z is M,
M is selected from the class consisting of S, B, P, Si, S→O and P→O wherein $x$ is the valence of M.

The novel compounds prepared according to the spirit and scope of the invention can also be represented by the following:

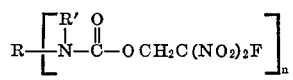

where R is a lower alkyl, lower alkylene dinitrofluoroalkyl, phenyl, phenylene or nitrophenyl, nitrophenylene R' is hydrogen or nitro and $n$ is 1 or 2; and by the formula $M[OCH_2C(NO_2)_2F]_x$ wherein $x$ is a whole number and it is the same as the number of the valence of M, and wherein M is a metalloid selected from the group consisting of boron, silicon, phosphorus and sulfur; and the formula $M'[OCH_2C(NO_2)_2F]_x$ wherein $x$ is a positive number and it is the valence of M' and M' is S→O or P→O.

DESCRIPTION OF PREFERRED EMBODIMENTS

In the preparation of the novel compounds of the present invention, when Z is

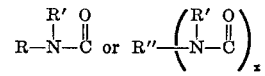

and when R' is H, the resulting compounds are carbamates formed from a reaction of an isocyanate with 2,2-dinitro-2-fluoroethanol in accord with the following general reactions:

(1)
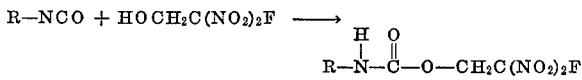

(2)
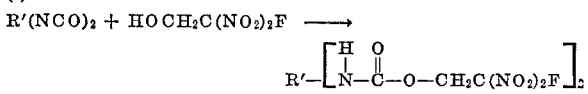

It will be noted that similar compounds formed from a reaction with 2,2-dinitro-2-fluoroethanol had been disclosed in copending application Ser. No. 563,019 filed June 27, 1966, by the same inventor. The previously disclosed compounds were also in the same general class of explosives.

The foregoing reactions (1) and (2) to form the carbamates are usually conducted at reflux temperature. Although the reactions can be formed at lower temperatures, the rate of reaction is usually too slow for practical purposes while at higher temperatures the reaction is often difficult to adequately control. It is usually desirable to conduct the reactions in the presence of an inert solvent such as chloroform. This insures a smoothness in the reaction and a better control over it. Other suitable inert solvents such as ethylene dichloride, carbon tetrachloride, or chlorobenzene can be utilized. Further, it is often desirable to conduct the reactions in the presence of a catalyst such as ferric acetonyl acetonate. The amount of catalyst used is quite small, generally in the range of $10^{-3}$ to $10^{-5}$ moles. This serves to further enhance the overall reaction toward the formation of the carbamate. Other suitable catalysts would include lead acetonyl acetonate, cupric acetonyl acetonate, and vanadyl acetonyl acetonate.

Generally, reactions (1) and (2) are carried out at atmospheric pressure. Though the pressure can be varied, no need is seen to create the additional conditions required for other than atmospheric pressure conditions. As can be seen, reactions (1) and (2) are of the addition type carried out by using stoichiometric portions. As a result, there is no requirement for an excess of one reactant over another in order to have maximum recovery of the desired end product. Generally, the reactions take from 1 to 24 hours. One is able to determine the completion of the reactions by the determination, by infrared analysis, of the presence of hydroxy or isocyanate functionality.

A non-limiting example of nitrofluoroethyl carbamates falling within the general formula given include:

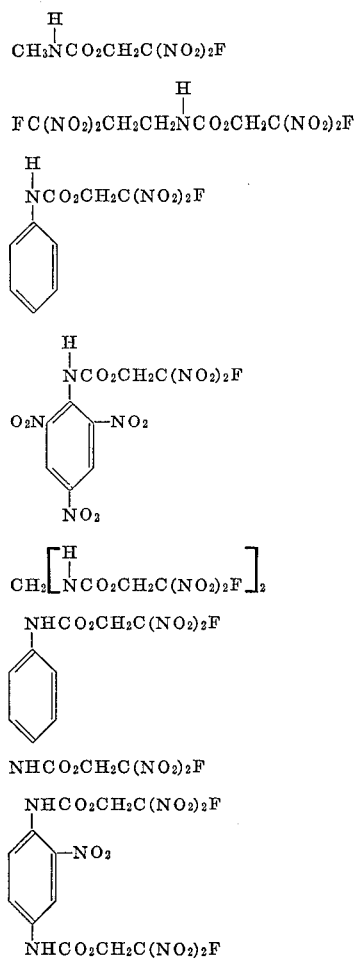

In the preparation of the novel compounds of the present invention, when Z is $$R-\underset{\underset{H}{|}}{N}-\underset{\underset{O}{\|}}{C} \text{ or } R'\left(\underset{\underset{H}{|}}{N}-\underset{\underset{O}{\|}}{C}\right)_x$$

and when R' is $NO_2$, the resulting compounds, N-nitro carbamates, are formed by the reaction of

or

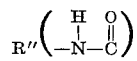

with $HNO_3$, according to the following equations:

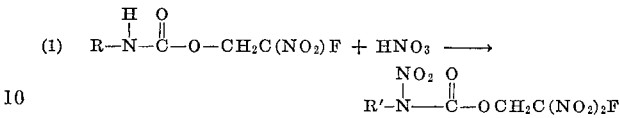

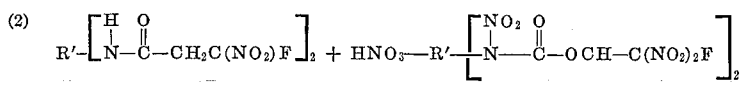

Turning to the esters of the invention, wherein the general formula Z is M, the method of preparing the compounds involves reaction of inorganic acid chlorides and acid oxychlorides with 2,2-dinitro-2-fluoroethanol according to the following general reaction:

(3) $MCl_n HOCH_2(NO_2)_2F \rightarrow M\{OCH_2C(NO_2)_2F\}_n + nHCl$ where $n$ is the valence of M.

Generally, the above reaction (3) is conducted in inert solvent such as methylene dichloride or ethylene dichloride. Other suitable solvents include carbon tetrachloride and chlorobenzene.

Usually it is desirable to use a catalyst such as pyridine or aluminum chloride which facilitates the completion of the reaction. The presence of the catalyst is particularly desirable when the reaction is carried out at the reflux temperature of the solvent. Normally, it is desirable to so carry out the reaction at the reflux temperature of the solvent because the rate of reaction at lower temperatures requires a much longer reaction time. Other suitable catalysts include triethyl amine, quinoline, and aluminum bromide. The amount of such catalyst can vary from a true catalytic amount, $10^{-3}$ to $10^{-5}$ moles, to a stoichiometric amount. For the preparation of the esters, best yields are obtained using a stoichiometric amount of catalyst.

The reaction can be carried out at temperatures other than the reflux one of the solvent. However, it is generally not as desirable because of the longer reaction time.

The reaction (3), like reactions (1) and (2), is normally carried out in atmospheric pressure since no need is seen for unduly complicating the reaction by increasing or lowering the pressure from ambient. Generally the time of reaction is from 1 to 24 hours. One can determine the completion of the reaction by measuring the amount of hydrogen chloride that is formed.

Illustrative, but not limiting examples of the compounds formed by reaction (2) include:

$B-[OCH_2C(NO_2)_2F]_3$ $O \leftarrow S-[OCH_2C(NO_2)_2F]_2$ $Si-[OCH_2C(NO_2)_2F]_4$ $O \leftarrow P-[OCH_2C(NO_2)_2F]_3$ $P-[OCH_2C(NO_2)_2F]_3$ $S-[OCH_2C(NO_2)_2F]_2$ The following examples are representative of embodiments of the mode and manner of the present invention and these examples are not to be construed as limiting as other obvious embodiments will be readily apparent to those versed in the art.

EXAMPLE I

Preparation of N-phenyl-2,2-dinitro-2-fluoroethyl carbamate.—A mixture of 1.54 g. (0.01 mole) of 2,2-dinitro-2-fluoroethanol, 1.19 g. (0.01 mole) of phenyl isocyanate, 15 ml. of dry chloroform, and a trace of ferric acetonyl acetonate was refluxed for 24 hours. The solution was concentrated in vacuo leaving a quantitative yield of white solid and having a melting point between 68 and 70° C. Recrystallization from ethanol-water did not raise the melting point.

Analysis.—Calculated for $C_9H_8FN_3O_6$ (percent): C, 39.56; H, 2.93. Found (percent): C, 40.10; H, 3.29.

EXAMPLE II

Preparation of N-methyl-2,2-dinitro-2-fluoroethyl carbamate.—2,2-dinitro-2-fluoroethanol 4.24 g. (0.0275 mole) and methylisocyanate 1.57 g. (0.0275 mole) were placed in a 50 ml. flask with 20 ml. of ethylene chloride. A pinch of ferric acetylacetonate catalyst was added to the magnetically stirred solution. The solution warmed slightly with the addition. The mixture was then refluxed for 2 hours and allowed to cool. The catalyst was filtered off and the solvent removed under reduced pressure. The residual liquid was distilled under vacuum through a short path column to yield 5.38 g. (93 percent yield) of N-methyl-2,2-dinitro-2-fluoroethylcarbamate. B.P. 84–86° C./1 mm., $n_D^{25}$ 1.4420, $d^{25}$ 1.525.

Analysis.—Calculated for $C_4H_6FN_3O_6$ (percent): C, 22.76; H, 2.86; N, 19.90. Found (percent): C, 23.08; H, 3.01; N, 19.61.

EXAMPLE III

Preparation of N-methyl-N-nitro-2,2-dinitro-2-fluoroethyl carbamate.—N-methyl-2,2-dinitro-2-fluoroethyl carbamate 5.02 g. (0.0238 mole) was dissolved in 35 ml. acetic anhydride. This solution was added dropwise into stirred absolute nitric acid (35 ml.) at 5 to 10 C. The stirring was continued for 1 hour after the addition. The mixture was poured onto approximately 40 g. ice. The aqueous mixture was extracted with 3–50 ml. portions of methylene chloride. The methylene chloride extracts were combined and washed 3 times with $H_2O$, 2 times with 5 percent $NaHCO_3$ and 2 times with $H_2O$. The final water wash was neutral. The extract was then dried over $NgSO_4$. The drying agent was removed and the methyl chloride removed under reduced pressure. The remaining liquid was distilled through a short path column under reduced pressure to yield 5.15 g. (84.5 percent yield) of N-methyl-N-nitro-2,2-dinitro-2-fluoroethylcarbamate. B.P. 111–113° C./0.015 mm. $n_D^{25}$ 1.4689, $d^{25}$ 1.598.

Analysis.—Calculated for $C_4H_5FN_4O_8$ (percent): C, 18.72; H, 1.95; N, 21.68. Found (percent): C, 18.85; H, 2.15; N, 21.72.

EXAMPLE IV

Preparation of methylene-bis-(2,2-dinitro-2-fluoroethyl) dicarbamate.—Methylene diisocyanate (0.37 g.; 3.88 mmole) fluorodinitroethanol (1.3 g., 8.44 mmole, 92 percent purity) and ferric acetylacetonate (catalytic quantities) were dissolved in 25 ml. of chloroform. This solution was heated to gentle boiling and refluxed overnight. On cooling solid precipitated. It was filtered and washed yielding 0.94 g. (61.5 percent yield) of crude methylene-bis-(2,2-dinitro-2-fluoroethyl) dicarbamate M.P. 124–127: Recrystallization from chloroform yielded pure material. M.P. 129.5–130.5°.

Analysis.—Calculated for $C_7H_8N_6O_{12}F_2$ (percent): C, 20.69; H, 1.98; N, 20.69. Found (percent): C, 20.85; H, 2.39; N, 20.69.

EXAMPLE V

Preparation of methylene-N,N'-dinitro-bis-(2,2-dinitro-2-fluoroethyl) dicarbamate.—A quantity of 1.25 ml. of absolute nitric acid was cooled in an ice bath and 1.25 ml. of acetic anhydride was added dropwise while maintaining the temperature below 5° C. Then 0.34 g. (0.838 mmole) of methylene-bis-(2,2-dinitroethyl) dicarbamate was added portionwise at 0–5° C. and stirring was continued for an additional 30 minutes. The solution was poured with stirring onto ice yielding a white sticky solid. The dried dicarbamate weighed 0.39 g. (94 percent yield). The infrared spectrum was consistent with the assigned structure.

EXAMPLE VI

Preparation of tris-(2,2-dinitro-2-fluoroethyl) phosphate.—A solution of 1.54 g. (0.01 mole) of 2,2-dinitro-2-fluoroethanol and 5 ml. of methylene chloride was cooled in an ice bath and 0.91 g. (0.01 mole) of pyridine was added, followed by 0.51 g. (0.0033 mole) of phosphorous oxychloride. The solution was then refluxed for two hours, cooled, washed with 3 percent HCl, water, dried, and concentrated in vacuo leaving 1.1 g. (65.8 percent) of waxy white solid, having a melting point between 40 and 47° C. Low temperature crystallization from isopropyl alcohol raised the melting point to 49–51° C.

Analysis.—Calculated for $C_6H_6F_3N_6O_{16}P$ (percent): C, 14.20; H, 1.19; F, 11.28. Found (percent): C, 14.94; H, 1.68; F, 12.90.

The term metalloid as used herein and the inorganic members embraced by said term is well known to the scientific art; and, for the purpose of information reference is made to Advances in Inorganic Chemistry and Radiochemistry, Academic Press, Inc., New York, vol. 3, pp. 337 to 427, 1961. The term lower alkyl as used herein includes methyl, ethyl, propyl, isopropyl and the like. The term lower alkylene includes methylene, propylene, ethylene and the like.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A compound of the formula

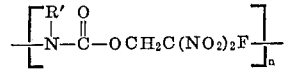

wherein R is lower alkyl, lower alkylene, dinitrofluoroloweralkyl, phenyl, nitrophenyl, phenylene or nitrophenylene, R' is hydrogen or nitro and n is 1 or 2.

2. The compoud of claim 1 wherein R is phenyl, R' is hydrogen and n is 1.

3. The compound of claim 1 wherein R is methyl, R' is hydrogen and n is 1.

4. The compound of claim 1 wherein R is methyl, R' is nitro and n is 1.

5. The compound of claim 1 wherein R is methylene, R' is hydrogen and n is 2.

6. The compound of claim 1 wherein R is methylene, R' is nitro and n is 2.

References Cited

UNITED STATES PATENTS

| | | | |
|---|---|---|---|
| 3,316,292 | 4/1967 | Schaeffler | 260—486 |
| 3,356,714 | 12/1967 | Kamlet | 260—487 |
| 3,387,044 | 6/1968 | Grakauskas et al. | 260—644 |

LELAND A. SEBASTIAN, Primary Examiner

U.S. Cl. X.R.

149—88, 92, 105; 260—462, 448.8, 482, 607, 954

PO-1050
(5/69)

UNITED STATES PATENT OFFICE
CERTIFICATE OF CORRECTION

Patent No. 3,576,840     Dated April 27, 1971

Inventor(s) Milton B. Frankel

It is certified that error appears in the above-identified patent and that said Letters Patent are hereby corrected as shown below:

Column 2, line 3, after "$NO_2$", delete "and wherein";

line 9, delete "R' is H or $NO_2$".

Column 4, lines 14-16, correct the formula to read:

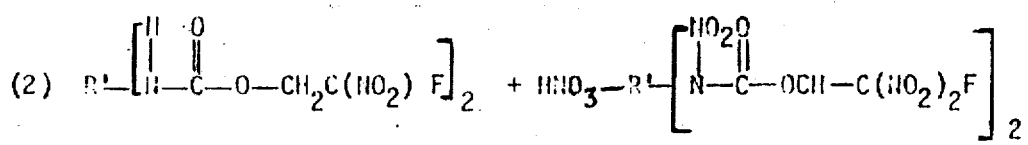

Column 4, lines 24-25, correct the formula to read:

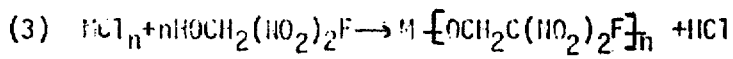

Claim 1. Correct the formula to read:

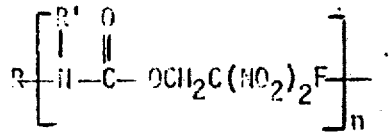

Signed and sealed this 16th day of November 1971

(SEAL)
Attest:

EDWARD M. FLETCHER, JR.
Attesting Officer

ROBERT GOTTSCHALK
Acting Commissioner of Patents